United States Patent
Lee et al.

(10) Patent No.: US 6,847,632 B1
(45) Date of Patent: Jan. 25, 2005

(54) METHOD AND APPARATUS FOR DIGITAL CELLULAR INTERNET VOICE COMMUNICATIONS

(75) Inventors: Michael C. G. Lee, Ottawa (CA); Francis Durufle, Hull (CA); Bill Allan, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/218,411

(22) Filed: Dec. 22, 1998

(51) Int. Cl.[7] .................. H04L 12/66; H04L 12/28; H04J 1/14

(52) U.S. Cl. .............. 370/352; 370/395.2; 370/496; 455/466

(58) Field of Search ................ 455/466, 414, 455/433, 435, 445; 370/352, 331, 353, 356, 400, 401, 389, 312, 493, 494, 495, 465, 466, 357, 328, 313; 709/230

(56) References Cited

U.S. PATENT DOCUMENTS

| | | | |
|---|---|---|---|
| 5,574,773 A | * 11/1996 | Grob et al. ............ 455/466 |
| 5,793,762 A | 8/1998 | Penners et al. ........... 370/389 |
| 5,805,587 A | 9/1998 | Norris et al. ............. 370/352 |
| 6,047,194 A | * 4/2000 | Andersson .............. 455/466 |
| 6,061,572 A | * 5/2000 | Laiho ................. 455/466 |
| 6,067,529 A | * 5/2000 | Ray et al. .............. 455/466 |
| 6,226,678 B1 | * 5/2001 | Mattaway et al. ......... 709/230 |
| 6,249,811 B1 | * 6/2001 | Kido .................. 709/219 |
| 6,366,771 B1 | * 4/2002 | Angle et al. ............ 455/414 |
| 6,430,174 B1 | * 8/2002 | Jennings et al. .......... 370/352 |
| 6,434,395 B1 | * 8/2002 | Lubin et al. ............ 455/466 |

* cited by examiner

Primary Examiner—Hanh Nguyen

(57) ABSTRACT

A digital cellular handset capable of supporting voice communications over the Internet, in addition to the digital cellular handset's usual mode of voice communications over the digital cellular network/public telephony network is disclosed. Internet protocol software such as H.323, Session Initiation Protocol (SIP), and Media Gateway Control Protocol (MGCP) is stored within the digital cellular handset device run on an H.323 Digital Signal Processor (DSP) and H.323 microcontroller to packetize and unpacketize the digital data streams received by or transmitted from the handset. There is also disclosed the use of the Short Message Service (SMS) with PCS digital cellular communication systems to allow call alerting for digital cellular call set-up, initiation and establishment.

26 Claims, 6 Drawing Sheets

| BITS NO | 7 | 6 | 5 | 4 | 3 | 2 | 1 | 0 | |
|---|---|---|---|---|---|---|---|---|---|
| 1 | 0 | 1 | 0 | 0 | 1 | 0 | 0 | 1 | |
| NUMBER OF OCTETS 2 | 1 | 1 | 1 | 0 | 1 | 0 | 0 | 0 | |
| 3 | 0 | 0 | 1 | 1 | 0 | 0 | 0 | 0 | TP-UD |
| 4 | 1 | 1 | 0 | 0 | 1 | 0 | 0 | 0 | |
| 5 | 0 | 1 | 1 | 0 | 0 | 1 | 0 | 0 | |
| 6 | 0 | 1 | 0 | 0 | 1 | 0 | 1 | 0 | |
| 7 | 1 | 0 | 1 | 0 | 0 | 0 | 1 | 1 | |
| ... | | | | | | | | | |
| 140 | | | | | | | | | |

FIG. 4B

METHOD AND APPARATUS FOR DIGITAL CELLULAR INTERNET VOICE COMMUNICATIONS

FIELD OF THE INVENTION

The present invention relates to digital cellular communication systems, and in particular to digital cellular communication systems facilitating voice communications over the Internet.

BACKGROUND OF THE INVENTION

In recent years, the popularity of digital cellular communication systems has been phenomenal. Today, digital cellular subscribers number in the millions throughout the world. The growth of the digital cellular market has fuelled research into novel services for use by subscribers, including caller ID, fax messaging, voice mail, call waiting, call forwarding and conference calls. The newest generation of digital cellular communication systems, PCS, introduced a range of features and services surpassing those previously available including include sleep mode, short message service (SMS), increased resistance to eavesdropping, text dispatch service, etc.

SMS, which first appeared in the early 1990s in Europe, provides a mechanism for transmitting short messages to and from digital cellular handsets. A Short Message Service Center (SMSC) is used to store and forward short messages to PCS digital cellular handsets. The digital cellular telecommunications network is used to transport the messages between the SMSC and the digital cellular handsets. A digital cellular handset that is active can receive or transmit a short message at any time, regardless of whether a voice or data call is in progress. SMS is characterized by out-of-band packet delivery and low-bandwidth message transfer.

At the same time as digital cellular communications have gained in popularity, the Internet itself has grown to be considered as an alternative voice communication tool. In recent years there have been many advancements and developments in the area of Internet telephony, which refers to communication services e.g. voice, facsimile, and/or voice-messaging applications that are transported via the Internet, rather than the Public Switched Telephone Network (PSTN). Telephone subscribers are drawn to Internet telephony as an alternative to traditional forms of communications, especially for long-distance telephone calls, because it offers tremendous cost savings relative to the PSTN. With the use of Internet telephony, subscribers can bypass long-distance carriers and their per-minute usage rates and run their voice traffic over the Internet for a flat monthly Internet access fee.

Due to the complexity of both the digital cellular telecommunications systems and the hardware and software requirements of Internet telephony, there are no prior art systems that marry the flexibility of digital cellular communications systems with the cost savings of Internet telephony. Since digital cellular handsets have no fixed location, call set-up, initiation and establishment are particularly difficult to accomplish in the Internet domain.

Consequently, a need has developed to provide a system for providing a digital cellular handset that is enabled for Internet telephony. Still further, a need has developed to provide a means for setting up, initiating and establishing a digital cellular telephone call over the Internet.

SUMMARY OF THE INVENTION

In accordance with one aspect of the present invention, there is provided a digital cellular handset capable of supporting voice communications over the Internet, in addition to the digital cellular handset's usual mode of voice communications over the digital cellular network/public telephony network.

In accordance with another aspect of the present invention there is provided the use of the Short Message Service (SMS) with PCS digital cellular communication systems to allow call alerting for call set-up, initiation and establishment.

Internet communications facilitated by the present invention are enabled by embedding Internet protocol software within the digital cellular handset device, and by modifying the handset's hardware to accommodate the novel features of the present invention.

In operation, a digital cellular handset of the present invention will establish a normal data call through the digital cellular network and into the Internet. The data call will establish a data link between the handset and an Internet-enabled terminating device (such as a computer or Internet phone) on the Internet. Once the Internet enabled terminating device and the digital cellular handset have established a data connection, both units will exchange voice telephony information over the data link. The voice telephony information will be encoded as per one of the emerging Internet voice protocols such as ITU H.323 voice over Internet protocol (International Telecommunication Union Standard H.323: Visual Telephone System and Equipment for Local Area Networks Which Provide a Non-Guaranteed Quality of Service) which will be built into the handset and run on an H.323 Digital Signal Processor (DSP) and H.323 processor device. Other emerging voice over Internet standards may also be employed, such as Session Initiation Protocol (SIP), and Media Gateway Control Protocol (MGCP).

Hardware modifications to prior art digital cellular handsets will be required to allow the voice information received over the data link to be used. These include: i. increased DSP resources and memory to run the Internet voice protocol, and, ii. an internal pathway must be set up to allow the Internet information received over the data path to be applied to the audio path after it has been processed by the DSP. In accordance with one embodiment of the present invention, the hardware modifications will make use of existing audio Analog to Digital (A/D) converters, Digital to Analog (D/A) converters, and audio transducers in the handset. The handset must be modified to allow the information received over the data path to be applied to the audio path after it has been processed by the handset's H.323 Digital Signal Processor (DSP) and H.323 processor device. Normally when a data call is made with a digital cellular handset, the data does not interact with the voice path at all but is sent out the data interface on the handset to another device such as a laptop computer.

In accordance with the present invention, there is established a normal cellular/PCS data call from a user's digital cellular handset to an Internet Service Provider (ISP) connected to the Internet. From the ISP, the data from the digital cellular handset is then transferred over the Internet in packet form to a far end device, be it an Internet protocol enabled telephone (wireline or digital cellular), or voice enabled computer. The digital cellular handset-to-ISP portion of the data link will typically be local to the user's geographic area and will thus incur no long distance charges. The Internet portion of the data link can connect the user to any geographically distant far end device, limited only by the reach of the Internet. Typically, the Internet portion of the data link will be free of long distance charges and will only incur Internet service provider fees.

Once the data link is established end-to-end, the digital cellular handset and the far end device will run well-known Internet voice protocols to translate the data packets so that interactive voice communication can be realized. For example, the data packets transmitted between the user's digital cellular handset and the far end device over the Internet then will be converted into voice signals as per ITU H.323. The data rates of digital cellular and PCS networks in use today (9.6 Kilobits/s to 14.4 Kilobits/s) are sufficient to support the present invention. Of course, persons skilled in the art will recognize that the quality of voice communication will improve as data rates increase, and Internet-inherent delays decrease.

Another aspect of this invention is the use of SMS as an alerting mechanism for call set-up and initiation, when the called device has no fixed Internet Protocol (IP) address. A common problem with Internet telephony is that currently there is no mechanism for the calling device to alert the called device of an incoming call, where that device has no fixed IP address.

The present invention makes use of the existing SMS to accomplish end-to-end alerting between a digital cellular handset device and an Internet protocol enabled far end device. When a digital cellular handset user wants to establish a voice call over the Internet with an Internet protocol enabled far end device that has no fixed IP address, the present invention provides for the forwarding of an SMS containing an IP address to the far end device to provide call alerting and set-up. The SMS that is sent also contains an embedded Internet protocol call request message for receipt by the far end device. The Internet protocol call request message will instruct the far end device to use the IP address to initiate a voice over Internet protocol session with the calling device (i.e. the digital cellular handset). An Internet call will then be established.

In accordance with an aspect of the present invention there is provided a digital cellular handset comprising: an antenna; a radio transceiver connected to said antenna; a radio analog-to-digital converter and a digital-to-analog converter connected to said transceiver; a digital cellular processor/microcontroller connected to said radio analog-to-digital and digital-to-analog converters; an Internet protocol processor/microcontroller connected to said digital cellular processor/microcontroller; an audio analog-to-digital converter and a digital-to-analog converter connected to said Internet protocol processor/microcontroller; and a speaker connected to said audio digital-to-analog converter and a microphone connected to said audio analog-to-digital converter; wherein, in the receive direction the transceiver receives radio signals from said antenna and converts them into analog baseband signals, the radio analog-to-digital converter converts said analog baseband signals into raw data signals, the digital cellular processor/microcontroller processes said raw data signals into a voice over Internet Protocol packetized data stream, the Internet protocol processor/microcontroller unpacketizes said voice over Internet Protocol packetized data stream into a voice data stream, the audio digital-to-analog converter converts said voice data stream into analog waveforms, and the speaker broadcasts said analog waveforms, and, in the transmit direction the microphone receives analog waveforms, the audio analog-to-digital converter converts said analog waveforms into raw data signals, the Internet protocol processor/microcontroller packetizes said raw data signals into a voice over Internet Protocol packetized data stream, the digital cellular processor/microcontroller processes said voice over Internet Protocol packetized data stream into a voice data stream, the radio digital-to-analog converter converts said voice data stream into analog signals, and the transceiver converts the analog signals into a modulated carrier signal which is forwarded to said antenna.

In accordance with another aspect of the present invention there is provided a method of digital cellular communications comprising the steps of: receiving radio signals from a digital cellular network; converting said radio signals into raw data signals; processing said raw data signals into a voice over Internet Protocol packetized data stream; unpacketizing said voice over Internet Protocol packetized data stream into a voice data stream; converting said voice data stream into analog waveforms; broadcasting said analog waveforms.

Methods and apparatuses for the transmit direction, as well as both transmit and receive directions are also described herein.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Preferred embodiments of the invention will now be described with reference to the attached drawings in which:

FIG. 4B is a schematic diagram of a portion of an SMS packet containing an IP communication request, and an IP address; and, FIG. 5 is a block diagram of an Internet protocol-enabled digital cellular handset.

DETAILED DESCRIPTION OF THE PREFERRED EMBODIMENT

All digital cellular systems, including EIA/TIA 553 Analog Mobile Phone System (AMPS), IS-136 Time Division Multiple Access (TDMA) digital system, IS-95A Code Division Multiple Access (CDMA) digital system, J-STD-008 (CDMA) PCS System, J-STD-007 (PCS1900), J-STD-009 (TDMA), Global Standard for Mobiles (GSM) have data transmission capabilities. The present invention uses these data transmission capabilities to facilitate voice communication over the Internet. While the present invention is applicable to any of the PCS and cellular systems set out above, it is unlikely to be implemented in the older AMPS system. This is because the present invention requires digital signal processing resources within a digital cellular handset that an AMPS handset would not normally have. As well, since the AMPS system does not provide for SMS, that aspect of the present invention would not be able to be implemented with AMPS system in any event. AMPS would also require the incorporation of a modem device in order to transmit data.

In general, the first step in the establishment of a digital cellular Internet call is the establishment of a digital cellular data call from the calling device to the called device. Once the calling device and the called device have established a data connection, both units will exchange voice telephony information over the data link. The voice telephony information will be encoded as per one of the emerging Internet voice protocol such as ITU H.323 voice over Internet protocol which will be built into both the calling device and the called device.

In order for an Internet call to be carried out, the called device and the calling device must exchange IP addresses. Knowledge of the other party's IP address is mandatory for interactive Internet communications. First and foremost, the calling device must have knowledge of the called device's IP address for an Internet call to be initiated.

Figure 1:
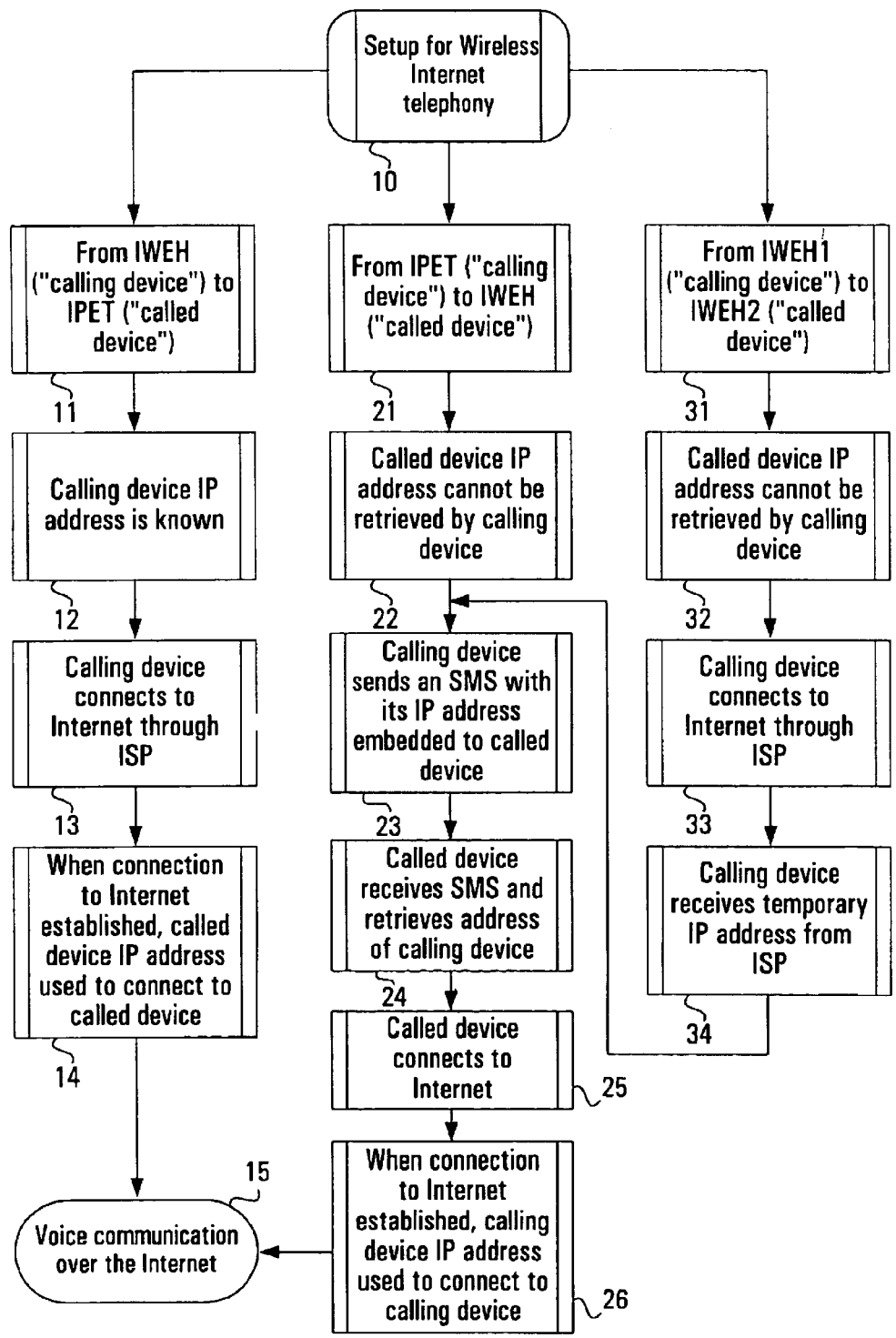
FIG. 1 is a flow chart of three scenarios for the establishment of digital cellular voice communications over the Internet.

FIG. 1 is a flow chart of three scenarios for the establishment of digital cellular voice communications over the Internet. Scenario 1 is from Internet Wireless Enabled Handset ("IWEH") to Internet Protocol Enabled Telephone ("IPET"), Scenario 2 is from IPET to IWEH, and Scenario 3 is from a first IWEH ("IWEH1") to a second IWEH ("IWEH2"). Step 10 is merely indicative of a set-up stage for all three scenarios.

Referring to Scenario 1 at step 11, an Internet-digital cellular call is to be established from an IWEH (the "calling device") to an IPET (the "called device"). In this situation, IPET is a fixed device having a permanent Internet Protocol (IP) address. At step 12, IWEH would retrieve the IP address of the called device from its memory. Typically, in an IWEH (such as a PCS1900), a directory of telephone numbers and IP addresses is stored on the Subscriber Identification Module (SIM) of the handset internal memory, or in an external EEPROM. This directory can be searched for the necessary IP address of IPET. Alternatively, an online IP directory address service could be accessed by IWEH to retrieve the IP address of IPET. At step 13, IWEH will then initiate a data call connection to the Internet through its Internet Service Provider (ISP). At step 14, using the IP address of IPET, IWEH will be connected to IPET over the Internet. At step 15, voice communications would commence over the Internet.

There is an alternative to Scenario 1 that is not illustrated in FIG. 1 for the situation where the called device has a fixed IP address but where the calling device cannot retrieve that IP address from its memory (either because it is not stored or for some other reason). If the calling device has the called device's e-mail address, the calling device can forward an e-mail to the called device, requesting that the called device initiate communications using Scenario 2, described below.

With respect to Scenario 2 at step 21, an Internet call is to be established from an IPET (the "calling device") to an IWEH (the "called device"). In this case, IWEH is mobile, and thus has no permanent IP address. Thus at step 22 it is determined that the IP address of IWEH cannot be retrieved. The purpose of the SMS steps of the invention is to facilitate communication where the calling device (such as an IPET) tries to reach a called device (such as an IWEH) that has no permanent IP address. As is explained in further detail with respect to FIG. 3, at step 23, IPET will send an SMS containing an IP communication request and its IP address to IWEH, and requesting that IWEH establish a call back to IPET. At step 24, IWEH receives the SMS and retrieves the IP address of IPET. Once IWEH receives the IP address of IPET, IWEH (the "called device") connects to the Internet at step 25. At step 26, when a connection to the Internet has been established, the IP address of IPET is used to connect IWEH to IPET. At step 15, voice communications over the Internet are exchanged.

With respect to Scenario 3 at step 31, an Internet call is to be established between two IWEHs, IWEH1 (the "calling device") and IWEH2 (the "called device"). In this case, both devices are mobile, and thus have no permanent IP address (step 32). At step 33, IWEH1 connects to the Internet through its ISP. At step 34, IWEH1 is assigned and receives a temporary IP address from its ISP. Once IWEH1 receives its temporary IP address, steps 23 et. seq. of Scenario 2 are used to establish a call to IWEH2.

Figure 2:
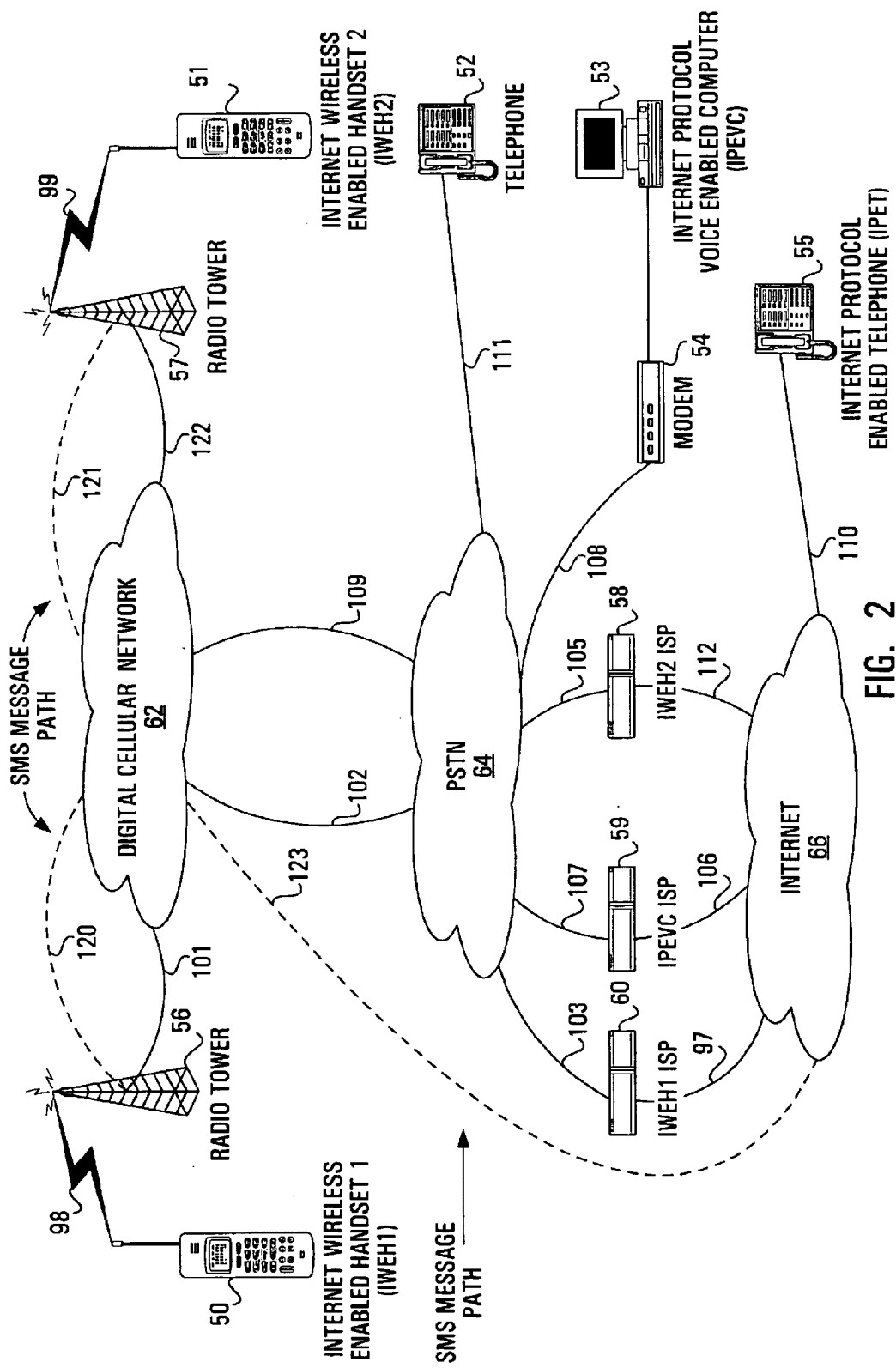
FIG. 2 is a schematic diagram of a typical Internet-digital cellular network topology.

FIG. 2 is a schematic diagram of a typical Internet-digital cellular network topology. As with FIG. 1, three scenarios for digital cellular Internet telephony will be discussed: (1) IWEH1 to IPET, (2) IPET to IWEH1, and (3) IWEH1 to IWEH2. A sub-scenario of Scenarios 1 and 2, between IWEH1 and Internet Protocol Voice Enabled Computer (IPVEC) will also be discussed. As with FIG. 1, call establishment refers to the establishment of a digital cellular data call from a calling device to a called device. Once the calling device and the called device have established a data connection, both units will exchange voice telephony information over the data link.

As a reference, the link path from IWEH1 50 to standard wireline telephone 52 will first be presented. This is a non-Internet call. When a call is initiated from IWEH1 50, a radio link 98 is established with radio tower 56. A connection is then established between radio tower 56 and digital cellular network 62 over link 101. A call initiated by IWEH1 50 and destined for telephone 52 is transmitted across digital cellular network 62, and to PSTN 64 through link 109. The call is passed across PSTN 64 and to telephone 52 across local link 111.

In scenario 1, the link path from IWEH1 50 to IPET 55 is considered. This is an Internet call. In this situation, IPET 55 is an Internet protocol enabled fixed device having a permanent IP address. As such, IWEH1 50 would know the IP address of IPET 55, or would have the capability to retrieve it. Using this IP address, IWEH1 50 establishes a connection to its ISP 60 through links 98, 101, 102 and 103. ISP 60 would then assign a temporary IP address to IWEH1 50 using the Dynamic Host Configuration Protocol (DHCP) described in RFC-1541 from the IETF. The Internet protocol (such as H.323, SIP or MGCP) used to establish the connection would embed this temporary IP address into the data being transmitted to IPET 55. IPET 55 will use this temporary IP address to transmit data back to IWEH1 50 to facilitate interactive communications. Next, using IPET's IP address, ISP 60 will initiate a connection between itself and IPET 55. The link path for this connection would be across Internet 66 over links 97 and dedicated Internet link 110. In this case, IPET 55 has a direct connection to the Internet through a router and/or gateway (not shown). Communications emanating from IPET 55 to IWEH1 50 would follow the reverse path.

A sub-scenario of Scenario 1 is a call from IWEH1 50 to IPVEC 53. As with IPET 55, IPVEC 53 is a fixed device with a permanent IP address. In this scenario, IWEH1 50 would either know the IP address of IPVEC 53, or would have the capability to retrieve it. With this IP address, IWEH1 50 establishes a connection to its ISP 60 though links 98, 101, 102 and 103. ISP 60 would then assign a temporary IP address to IWEH1 50. Next, using IPVEC's IP address, ISP 60 will initiate a connection between itself and ISP 59, the ISP providing Internet services to IPVEC 53. The link path for this connection would be across Internet 66 over links 97 and 106. Unlike IPET 55, IPEVC 53 does not have a direct connection to the Internet. As a result, ISP 59 must establish a connection through link 107, across PSTN 64, to local link 108 and modem 54. Modem 54, which is shown exterior to IPEVC for illustration purposes only, provides the final connection to IPEVC 53. Of course, persons skilled in the art will appreciate that local link 108 and modem 54 are merely representative of a wide number of interconnections with the Internet, including cable modems and Digital Subscriber Line (DSL) technologies. Communications emanating from IPVEC 53 to IWEH1 50 would follow the reverse path.

In Scenario 2, the link path from IPET 55 to IWEH1 50 is considered. This is an Internet call. In this situation, while IPET 55 is a fixed device with a permanent IP address, IWEH1 50 is mobile, and thus has no permanent IP address. The purpose of the SMS steps of the invention is to facilitate communication where the calling device (such as IPET 55) tries to reach a called device (such as IWEH1 50) that has no permanent IP address. In the circumstances, it is necessary that an SMS message containing the IP address for IPET 55 be sent to IWEH1 50 so that a call can be established. For this to be accomplished, IPET 55 connects to the Internet 66 through dedicated Internet link 110. An appropriate SMS server (not shown) within Internet 66 and working in conjunction with the digital cellular service provider of IWEH1 50 will be used to send an SMS message to IWEH1 50. SMS servers of this type are well known in the art, and are used to enable wireline customers to send SMS message to digital cellular customers. The SMS message, sent across links 123 and 120 to radio tower 56, will be embedded with the IP address for IPET 55. Radio tower 56 will transmit the SMS to IWEH1 50 across radio link 98 using conventional methods. IWEH1 will store the IP address received in its memory. At this point, IWEH1 50 is aware of the IP address of IPET 55, and therefore call establishment between IWEH 50 and IPET 55 will follow the stages set out above in accordance with Scenario 1.

With reference to sub-scenario 2, i.e. a call between IPEVC 53 and IWEH 50, a similar procedure is employed. Once again, while IPEVC 53 is a fixed device with a permanent IP address, IWEH 50 is mobile, and thus has no permanent IP address. Once again, it is necessary that an SMS message containing the IP address for IPET 55 be sent to IWEH1 50 so that a call can be established. For this to be accomplished, IPEVC 53 connects to the Internet 66 though modem 54, PSTN 64 and ISP 59. As above, an appropriate SMS server (not shown) within Internet 66 and working in conjunction with the digital cellular service provider of IWEH1 50 will be used to send an SMS message to IWEH1 50. The SMS message, sent across links 123 and 120 to radio tower 56, will be embedded with the IP address for IPEVC 53. Radio tower 56 will transmit the SMS to IWEH1 50 across radio link 98 using conventional methods, to be described in detail below. IWEH1 50 will store the IP address received in its memory. At this point, IWEH1 50 is aware of the IP address of IPEVC 53, and therefore call establishment between IWEH1 50 and IPET 55 will follow the stages set out above in accordance with Scenario 1.

In scenario 3, the link path for call establishment from IWEH1 50 to IWEH2 51 is considered. This is an Internet call. In this situation, neither the calling device nor the called device has a permanent IP address because these are both mobile devices. To establish a call connection, IWEH1 50 will first contact ISP 60 across links 98, 101, 102, and 103 to obtain a temporary IP address. The temporary IP address will then be returned to IWEH1 50 over a reverse path. At this point, IWEH1 50 is aware of its IP address, and therefore call establishment between IWEH1 50 and IWEH2 51 will follow similar stages to those set out above in accordance with Scenario 2. In brief, IWEH1 will forward an SMS message to IWEH2 containing its IP address. Upon receipt of this SMS message, IWEH2 will strip off the IP address, and establish a connection across digital cellular network 62 and PSTN 64 to ISP 58, the ISP that provides it with access to the Internet. ISP 58 would then assign a temporary IP address to IWEH2 51. Next, using IWEH1's IP address, ISP 58 will initiate a connection between itself and ISP 60, the ISP providing Internet services to IWEH1 50. A final connection will then be established between ISP 60 and IWEH1 50.

Figure 3:
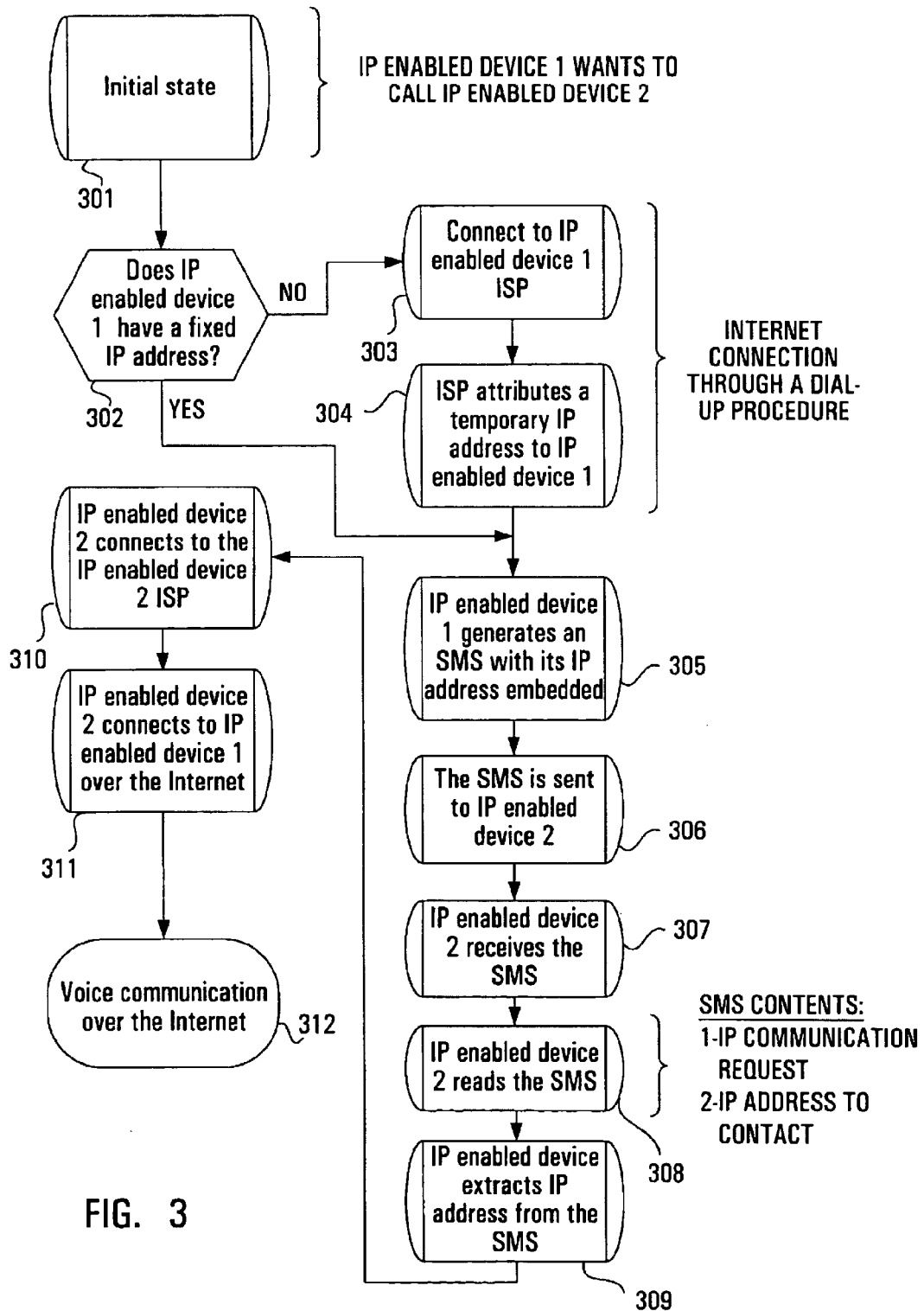
FIG. 3 is a flowchart of steps showing how SMS is used to establish a digital cellular call over the Internet.

FIG. 3 is a flowchart of steps showing how an SMS message is used to establish a digital cellular call over the Internet under scenario 3. The steps shown in FIG. 3 are similar to those shown in FIG. 1, but with further detail provided.

Step 301 is the initial state, where IP enabled device 1 (be it an IWEH, IPET, or IPEVC), wishes to reach IP enabled device 2 using an Internet digital cellular connection, and where IP enabled device 2 is a mobile device having no fixed IP address. At step 302, a decision is made as to whether IP enabled device 1 has a fixed IP address. If IP enabled device 1 is an IPET or IPEVC, then the next step is step 305. If IP enabled device 1 is an IWEH, then at steps 303 and 304, an Internet connection is made between IP enabled device 1 and its ISP so the device can be assigned a temporary IP address. In this case, IP enabled device 1 (which is an IWEH), will run an application program embedded in its microcontroller to connect to its ISP. When its ISP answers the call from IP enabled device 1, a data connection will be established with IP enabled device 1, which will be received through the device's radio input/output device (i.e. antenna), radio transceiver, digital signal processor and microcontroller. The temporary IP address of IP enabled device 1 assigned by the ISP will be transmitted to the device by way of this data connection.

Figure 4A:
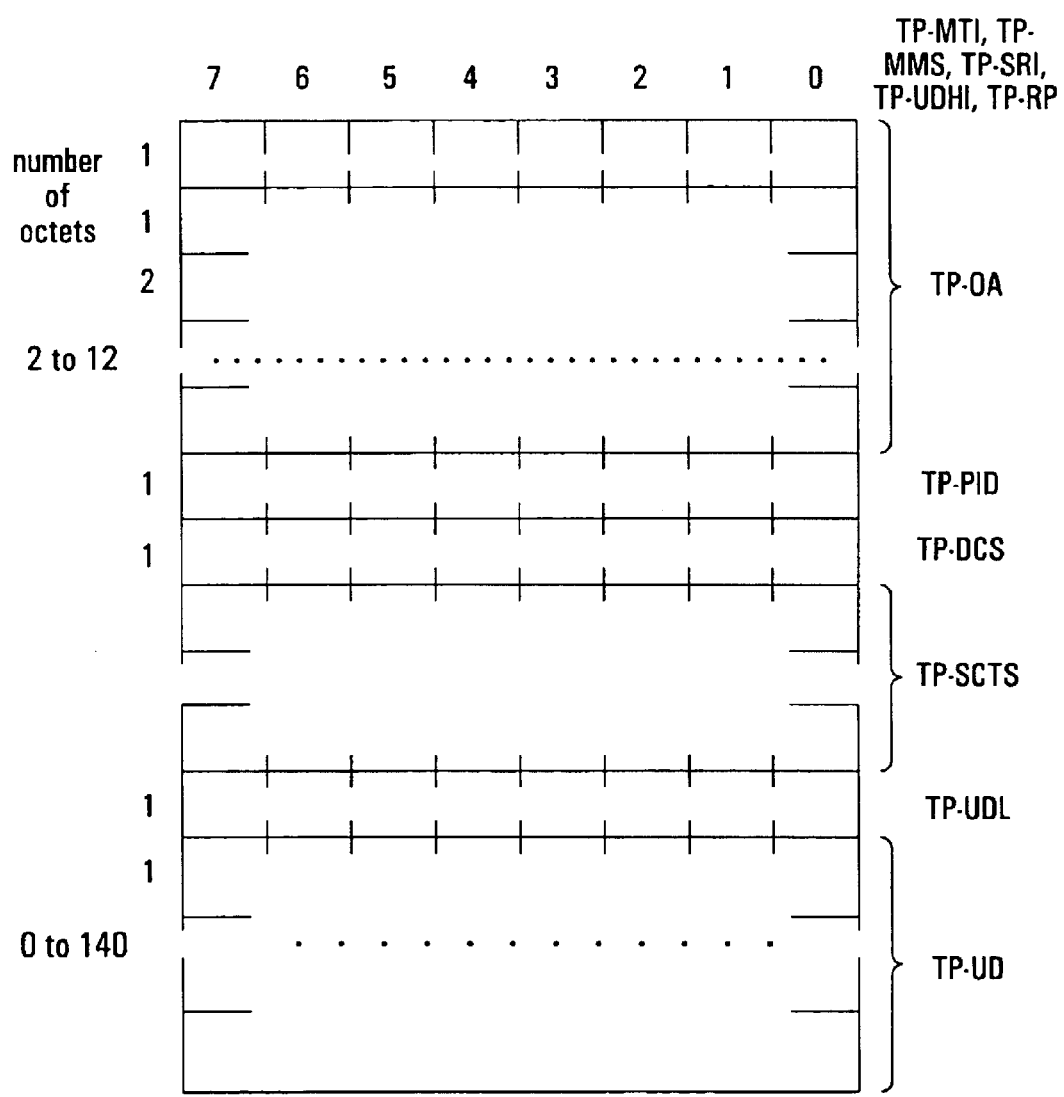
FIG. 4A is a schematic diagram of an SMS data packet.

At step 305, the microcontroller (in the case of an IWEH) or microprocessor (in the case of an IPET or IPEVC) of IP enabled device 1 will generate an SMS with an IP communication request, and its IP address embedded therein. The layout of the SMS message to be delivered is shown in FIG. 4A.

The data size of an SMS-DELIVER packet is 140 octets. The definitions of the various parameters contained in an SMS-DELIVER packet are described in Table 1 as follows:

TABLE 1

Description of Parameters Contained in SMS-DELIVER Packet

| Abbreviation | Reference | Description |
| --- | --- | --- |
| TP-MTI | TP-Message-Type-Indicator | Parameter describing the message type |
| TP-MMS | TP-More-Messages-to-Send | Parameter indicating whether or not there are more messages to send |
| TP-RP | TR-Reply-Path | Parameter indicating that Reply Path exists |
| TP-UDHI | TP-User-Data-Header-Indicator | Parameter indicating that the TP-UD field contains a Header |
| TP-SRI | TP-Status-Report-Indication | Parameter indicating if the (Short Message Entity) SME has requested a status report |
| TP-OA | TO-Originating Address | Address of the originating SME |

TABLE 1-continued

Description of Parameters Contained in SMS-DELIVER Packet

| Abbreviation | Reference | Description |
| --- | --- | --- |
| TP-PID | TP-Protocol-Identifier | Parameter identifying the above layer protocol, if any |
| TP-DCS | TP-Data-Coding-Scheme | Parameter identifying the coding scheme within the TP-User-Data |
| TP-SCTS | TP-Service-Centre-Time-Stamp | Parameter identifying time when the SC received the message |
| TP-UDL | TP-User-Data-Length | Parameter indicating the length of the TP-User-Data field to follow |
| TP-UD | TP-User-Data | Parameter containing the user data to be transmitted |

Any unused bits will be set to zero by the sending entity and will be ignored by the receiving entity. Persons skilled in the art will appreciate that the majority of the above parameters would be set to standard values independent of the IP communication request, and IP address sent by IP enabled device 1. For the purposes of the present invention, the essential components of the SMS message are as follows:

i. TP-UDHI is set to "1" to indicate that the TP-User-Data contains header information that must be acted upon by the SMS recipient's (i.e. IP enabled device 2) microcontroller;

ii. the first component of the TP-User-Data header contains a type field used to uniquely identify an IP communication request. A suggested type field for this purpose would be "IPCALLRQ"; and, iii. the second component of the TP-User-Data header contains the IP address of IP enabled device 1.

FIG. 4B is a schematic diagram of a portion of an SMS packet containing an IP communication request (IPCALLRQ), and a hypothetical IP address <47.127.80.111> for IP enabled device 1. The IP communication request and IP address would be embedded in octets 1–140 of TP-UD, as illustrated in FIG. 4B. Of course, as the Internet evolves, expanded IP addresses, or those of different formats, can be accommodated by the present invention.

Referring back to FIG. 3, at step 306, the SMS is sent over the digital cellular network to IP enabled device 2. Persons skilled in the art will be familiar with the network elements and architecture, involved in SMS transfer. These include a Short Message Service Center (SMSC), SMS-Gateway/Interworking Mobile Switching Center (SMS-GMSC), Home Location Register (HLR), Mobile Switching Center (MSC), Visitor Location Register (VLR), and Base Station System (BSS). The details of SMS network elements involvement are not essential to the operation of the invention.

At step 307, IP enabled device 2 receives the SMS containing the IP communication request and IP address of IP enabled device 1. At steps 308 and 309, the microcontroller of IP enabled device 2 will recognize the IP communication request in TP-UD, and extract the IP address of IP enabled device 1 from the SMS. At step 310, the microcontroller of IP enabled device 2 will then initiate a data connection to its ISP for the purpose of enabling Internet communications with IP enabled device 1 with the use of that device's IP Eli address. At step 311, a connection is made over the Internet to IP enabled device 1. At step 312, voice communication is exchanged between IP enabled device 1 and IP enabled device 2 over the Internet.

Figure 5:
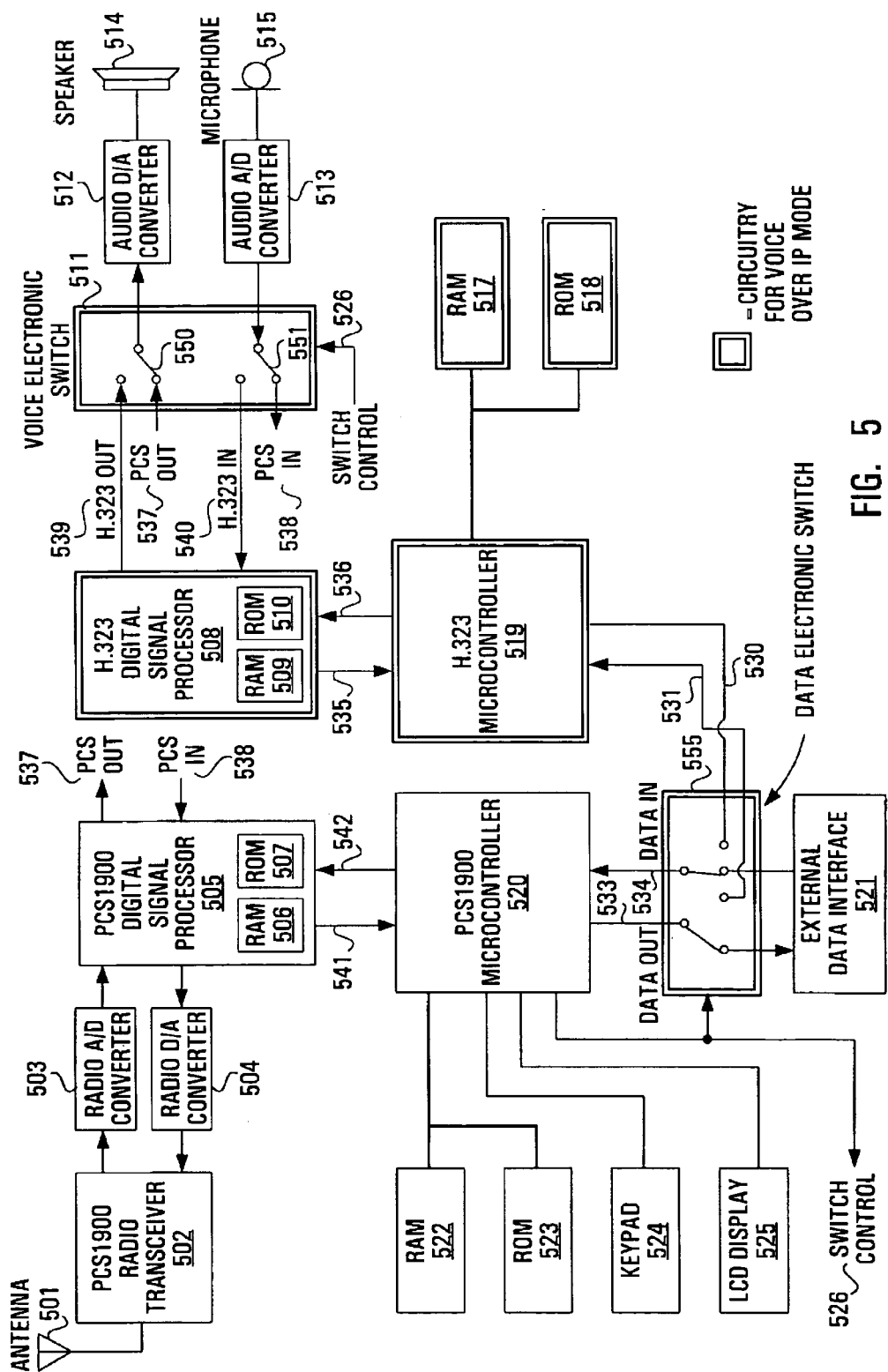

FIG. 5 is a block diagram of an Internet protocol-enabled digital cellular handset. The following description of the present invention will use the PCS1900 (J-STD-0007) digital cellular network as the implementation example, although as noted this invention is applicable to all-digital cellular and PCS networks. As mentioned, this invention is equally applicable to other digital cellular/PCS handsets. As such, the functional block diagrams for the other cellular/PCS handsets would be similar to that of FIG. 5.

FIG. 5 shows a typical PCS1900 handset circuitry block diagram, with the additional components necessary to perform H.323 Internet telephony indicated in doubled line form. It should be noted that the present invention is also applicable to other emerging Internet voice protocols such as SIP and MGCP, and H.323 has been selected for illustration purposes only.

In accordance with the present invention, the PCS1900 handset can work in three modes: (1) normal voice mode, (2) normal data mode, and (3) voice over IP mode. In normal voice mode, the user is able to have a voice conversation with another party using the normal voice facilities provided by the digital cellular network. In normal data mode, bi-directional data is provided at an External Data Interface 521 that can be connected to an external device such as a laptop computer. Voice communications are not operational during normal data mode.

In voice over IP mode, voice conversation is enabled by providing additional hardware resources to the handset and by performing H.323 protocols on these additional hardware resources. The additional hardware resources consist of an H.323 microcontroller 519 with external random access memory (RAM) 517 and a read only memory (ROM) 518, an H.323 Digital Signal Processor (DSP) 508 with internal RAM 509 and a ROM 510, a voice electronic switch 511, and a data electronic switch 555.

Ports Data Out 533 and Data In 534 connect the PCS1900 microcontroller 520 to the external data interface 521 through data electronic switch 555. Data electronic switch 555 provides a switched connection 531 between port Data Out 533 and H.323 microcontroller 519. A switched connection is also provided between port Data In 534 and H.323 microcontroller 519. In normal data mode, data electronic switch 555 is set so that data from PCS microcontroller 520 is sent to the external data interface 521. When in normal voice mode, the connection is still made between PCS microcontroller 520 and external data interface 521, but no data will be supplied to external data interface 521. When in voice over IP mode, data electronic switch is set so that data out from PCS microcontroller 520 is applied to H.323 microcontroller 519, and data out from H.323 microcontroller 519 is input to PCs microcontroller 520.

Connections 541 and 542 connect PCS1900 DSP 505 with PCS1900 microcontroller 520, and likewise connections 535 and 536 connect H.323 DSP 508 with H.323 microcontroller 519.

The H.323 DSP 508 requires internal RAM 509 and ROM 510 since high-speed operation is required. In general, ten nanosecond RAM and ROM is required for H.323 DSP 508. Less expensive and slower external RAM and ROM (i.e. 90 nanosecond) are sufficient for the H.323 microcontroller 519. A chart showing the memory requirements of all processing elements of this handset is as shown in Table 2. Table 2 also shows the processing power requirements of each block, given in million instructions per second (MIPS).

TABLE 2

RAM/ROM/MIPS Requirements for H.323 Enabled Handset

| Hardware | RAM (Kb) | ROM (Kb) | MIPS |
|---|---|---|---|
| PCS 1900 DSP 505 | 16 | 96 | 60 |
| H.323 DSP 508 | 36 | 44 | 60 |
| PCS 1900 Microcontroller 520 | 256 | 512 | 20 |
| H.323 Microcontroller 519 | 200 | 1024 | 30 |

In order to implement the present invention, specialized Internet protocol software algorithms must form part of H.323 DSP 508 and H.323 microcontroller 519. First, the H.323 lower layer protocol stack must be added to the H.323 DSP 508 protocol stack. Second, the higher H.323 layers must be added to the H.323 microcontroller software present in ROM 518. The software protocols which must be added are:

i. ITU-T H.323, Visual telephone systems and equipment for local area networks which provide a non-guaranteed quality of service. This is an umbrella standard which includes the following other standards:

ii. ITU-T Recommendation H.225.0 (1996) Media stream packetization and synchronization for visual telephone systems on non-guaranteed quality of service LANs. This is the call control signalling protocol);

iii. ITU-T Recommendation H.245 (1996), Control protocol for multimedia communications. This is the communications signalling protocol;

iv. CCITT Recommendation G.723.1 (1996), Speech coders: Dual rate speech coder for multimedia communications transmitting at 5.3 and 6.3 kbit/s; and, v. ITU-T Recommendation G.729 (1996) Coding of speech at 8 kbit/s using conjugate structure algebraic code excited linear prediction (CS-ACELP).

With reference to FIG. 5, the operation of the handset in each of the three modes outlined above will now be described.

During the Normal Voice Mode, PCS1900 DSP 505 and PCS1900 microcontroller 520 are active, while H.323 DSP 508 and H.323 microcontroller 519 are inactive and placed in a low-power standby state. PCS1900 microcontroller 520 sets signal Switch Control 526 to enable voice electronic switch 511 to select PCS OUT to Audio D/A converter 512 and PCS IN to audio A/D converter 513. This is the steady-state status of the PCS1900 handset before normal voice communications have been initiated. A stored program in ROM 523 is used to instruct PCS microcontroller 520 when to cause signal Switch Control 526 to switch the states of voice electronic switch 511 and data electronic switch 555, which will cause the handset to switch between normal voice mode, normal data mode, and voice over IP mode.

When voice communications are to be initiated, a PCS1900 radio base station (such as the one illustrated in FIG. 2) would transmit radio energy to the handset. The transmitted radio energy would contain digital voice information and control information as per J-STD-007. After call set-up has been negotiated between the handset and the base station via the control channel (as per J-STD-007), the handset would also transmit radio energy towards the base station. Radio energy in each direction is confined to a single 200 kHz channel (one of 300 full duplex channels in the PCS1900 system). The handset transmits on one channel within the band 1850–1910 MHz and the base station transmits simultaneously within the band 1930–1990 MHz. Each channel is further divided into 8 timeslots and the handset would be instructed by the base station to use specific timeslots for both transmitting and receiving.

The receive path of radio energy in normal voice mode is as follows. Antenna 501 receives a radio frequency (RF) signal from the base station. The PCS1900 transceiver 502 filters and amplifies the RF signal, and converts it to a baseband signal (typically between 0 to 200 kHz). The baseband signal is converted to digital by the radio A/D converter 503 and thereafter applied to the PCS1900 DSP 505. PCS1900 DSP 505 performs equalization and demodulation of the baseband signal in order to recover the digital bitstream sent by the base station. Frame alignment, error detection and correction, and demultiplexing of control data, and SMS data (if any) and voice data are also performed. Control messages are assembled into proper layer 3 format and are sent to PCS1900 microcontroller 520. PCS1900 microcontroller 520 receives the layer 3 messages and performs high-level protocol operations as per J-STD-007. These protocol operations include receiving calls, initiating calls, and controlling the overall operation of the handset. PCS1900 microcontroller 520, which has its own RAM 522 and ROM 523, also controls the user interface by receiving input from keypad 524 and sending information to the liquid crystal display (LCD) 525. The PCS1900 microcontroller 520 also sets the state of the switch control signal 526, which puts the handset into normal voice mode or voice over IP mode.

PCS1900 DSP 505 performs vector sum excited linear predictive coding (VSELP) decoding on the received voice bits. VSELP decoding converts the compressed voice information sent over the radio channel into non-compressed linear voice data. PCS1900 DSP 505 sends linear voice data via signal PCS OUT 537 through voice electronic switch 511 and connection 550 to the audio D/A converter 512. Audio D/A converter 512 converts the digital information into an analog audio waveform, which is amplified and applied to the handset speaker 514. The normal voice path is from PCS1900 DSP 505, through voice electronic switch 511 to the speaker 514 and vice versa.

The transmit path of the normal voice mode of the handset is essentially a reverse order process of the receive path. Analog audio waveforms received from handset microphone 515 are amplified, and applied to the Audio A/D converter 513. The audio A/D converter 513 converts the analog waveforms into linear voice data that are sent through the voice electronic switch 511 to the PCS1900 DSP 505 using signal paths 551 and PCS IN 538. The PCS1900 DSP 505 performs vector sum excited linear predictive encoding (VSELP) on the information. VSELP encoding converts the non-compressed linear voice data into compressed voice information. The PCS1900 microcontroller 520 sends layer 3 control messages to the PCS1900 DSP 505 as required. PCS1900 DSP 505 converts layer 3 messages into control data bits to be sent over the radio link to the base station. PCS1900 DSP 505 performs multiplexing of control data, SMS data (if any) and voice data into an assembled frame. PCS1900 DSP 505 adds error detection and correction bits to the assembled frame, and performs digital modulation on the information converting it to a digital baseband signal. The baseband signal is converted to an analog baseband signal by radio D/A converter 504. PCS1900 radio transceiver 502 modulates the analog baseband signal onto a particular radio channel specified by the PCS1900 microcontroller 520. PCS1900 radio transceiver 502 also amplifies the radio signal to a high power signal (up to 2 watts peak), and applies this signal at the appropriate timeslot onto the antenna 501. The antenna 501 converts the electrical signal into radio waves which are transmitted to the base station.

During the Normal Data Mode, PCS1900 DSP 505 and PCS1900 microcontroller 520 are active, while H.323 DSP 508 and H.323 microcontroller 519 are inactive, and in a low-power standby state. During this state, PCS1900 microcontroller 520 sets signal Switch Control 526 to enable voice electronic switch 511 to select signal path 550 to connect H.323 OUT 539 to audio D/A converter 512, and signal path 551 to connect H.323 IN 540 to audio A/D converter 513. H.323 DSP 508 is inactive, and thus no audio is heard through speaker 514.

In operation in this mode, PCS1900 radio base station first transmits radio energy to the handset. The radio energy contains digital data information and control information as per J-STD-007. After the call has been negotiated between the handset and the base station via a control channel (as per J-STD-007), the handset also transmits radio energy towards the base station. Radio energy in each direction is confined to a single 200 kHz channel (one of 300 full duplex channels in the PCS1900 system). The handset transmits on one channel within the band 1850 to 1910 MHz and the base station transmits simultaneously within the band 1930–1990 MHz. Each channel is further divided into eight timeslots and the handset is instructed by the base station to use a certain timeslot for transmitting and receiving.

The receive path is as follows. Antenna 501 first receives an RF signal from the base station. PCS1900 transceiver 502 filters and amplifies the RF signal, and then converts the signal to a baseband signal. (For example, radio channel #1 between 1,930.0 MHz and 1,930.2 MHz is converted to a baseband signal from 0 to 200 kHz). The baseband signal is then converted to digital by radio A/D converter 503 and thereafter applied to the PCS1900 DSP 505.

PCS1900 DSP 505 performs equalization and demodulation of the baseband signal in order to recover the digital bitstream sent by the base station. PCS1900 DSP 505 performs frame alignment, error detection and correction, demultiplexing of control data, short message service data (if any) and the data information. PCS1900 DSP 505 assembles control messages into proper layer 3 format and sends these control messages to the PCS1900 microcontroller 520.

PCS1900 microcontroller 520 receives layer 3 messages and performs the PCS1900 high-level protocol operations as per J-STD-007. These protocol operations ID, include receiving calls, initiating calls, and controlling the overall operation of the handset. PCS1900 DSP 505 then sends the raw data information to the PCS1900 microcontroller 520. The PCS1900 microcontroller 520 performs radio link protocol (RLP) on the received raw data from the PCS1900 DSP 505. The PCS1900 microcontroller 520 converts the data to asynchronous 9.6 kbit/sec data, and applies this data to the output pin of the external data port Data Out 533, where it is available to the external data interface 521. The signal path from PCS1900 DSP 505 through PCS1900 microcontroller and to external data port Data Out 533 and vice versa is the normal data path.

The transmit path of the normal data mode is essentially a reverse order process of the receive path. Data is input by an external device to the external data interface 521 which is connected to the PCS1900 microcontroller 520 by way of port Data In 534. The external device applies data at 9.6 Kbit/sec in an asynchronous format. PCS1900 microcontroller 520 performs radio link protocol (RLP) on the asynchronous data from the external data interface 521. The RLP essentially converts the data from an asynchronous format to a synchronous format. PCS1900 microcontroller 520 then sends the RLP data information to the PCS1900 DSP 505. The PCS1900 microcontroller 520 sends layer 3 control messages to the PCS1900 DSP 505 as required. PCS1900 DSP converts layer 3 messages into control data bits to be sent over the radio link to the base station. PCS1900 DSP 505 also performs multiplexing of control data, short message service data (if any) and RLP data into a frame.

PCS1900 DSP 505 adds error detection and correction bits to assembled frame, and performs digital modulation on the information converting it to a digital baseband signal. The baseband signal is then converted to an analog baseband signal by the radio D/A converter 504. PCS1900 radio transceiver 502 modulates the analog baseband signal onto a particular radio channel, which is specified by the PCS1900 microcontroller 520. PCS1900 radio transceiver 502 amplifies the radio signal to a high power signal (up to 2 watts peak), and applies this signal at the appropriate timeslot onto the antenna 501. The antenna 501 converts electrical signal into radio waves which are transmitted to the base station.

In voice over IP mode, PCS1900 DSP 505, PCS1900 microcontroller 520, H.323 DSP 508 and H.323 microcontroller 519 are all active. PCS1900 microcontroller 520 sets signal Switch Control 526 to enable voice electronic switch 511 to select H.323 Out to Audio D/A converter 512 across connection 550 and H.323 In to Audio A/D converter 513 across connection 551.

In operation, the first step is to place all handset circuitry not associated with the H.323 function (i.e. all circuitry other than H.323 DSP 508, H.323 microcontroller 519 and its RAM 517 and ROM 518) into PCS1900 normal data mode as outlined above. Thus 9.6 Kb/sec bi-directional data is available at ports Data Out 533 and Data In 534. However, the 9.6 Kb/sec asynchronous data will be applied across data electronic switch 555 to the H.323 microcontroller 519 through signal path 531, rather than the external data interface 521. Likewise, data from H.323 microcontroller 519 will be applied across data electronic switch 555 to Data In port 534 across signal path 530. With respect to the Receive Path in voice over IP mode, the operation details given above for the Normal Data Mode, Receive Path will apply. Thus, only the manner of processing the 9.6 Kb/sec asynchronous data will be described.

When the H.323 microcontroller 519 receives the 9.6 Kb/sec asynchronous data from the PCS1900 microcontroller 520, H.323 microcontroller 519 performs processing as per ITU-T H.323. (ITU-T H.323 is the umbrella recommendation which references other standards including H.225.0 and H.245). The 9.6 Kb/sec asynchronous data, which has the format of Internet Protocol packets, is first collected into a RAM buffer in RAM 517. H.323 microcontroller 519 examines the buffered data to find an Internet Protocol (IP) 20 byte header, followed by the next header after the IP 20 byte header. The header following the IP header is either a UDP (User Datagram Protocol) header which signifies voice information or a TCP (Transmission Control Protocol) header which will signify call control (H.225.0) or system control (H.245) information. H.323 microcontroller 519 then separates received data packets in terms of UDP (voice) header or TCP (call/system control) header into separate buffers in RAM 517. H.323 microcontroller 519 further separates TCP packets into either H.225.0 packets or H.245 packets, which are placed into separate buffers in RAM 517.

H.323 microcontroller 519 then processes H.225 Call Control packets from the RAM buffer. These packets are used for call control, signalling channels, call set up request, and call alerting. H.323 microcontroller 519 then processes H.245 System Control packets from the RAM buffer. These packets are used to open and close logical channels, exchange capabilities between terminal endpoints, and to describe the contents of the logical channels. H.323 microcontroller 519 then examines the UDP (voice) packets in the RAM buffer and strips off the RTP (Real Time Protocol) header from each packet. The RTP header contains a sequence number and time stamp for each incoming voice packet, and indicates which voice-encoding format is used, either G.723 or G.729. H.323 microcontroller 519 then sends a message to H.323 DSP 508 instructing the DSP which voice-encoding format to use based on the RTP header. The H.323 microcontroller 519 assembles the raw voice packets into a "jitter buffer" in RAM 517. This process involves examining the RTP header sequence number and placing the voice information into the buffer in the correct order in which it was sent, since packets can be received out of sequence. Also the RTP header time stamp is examined in order to determine if packets are missing. It missing packets are found they are replaced with the previous valid packet.

The H.323 microcontroller 519 then reads out the raw voice information from the RAM "jitter buffer" at regular intervals and supplies this to the H.323 DSP 508.

H.323 DSP 508 performs voice decoding on the raw voice information as per G.723 or G.729, converting the voice data to linear format. H.323 DSP 508 also performs echo cancellation on the decoded voice information, and applies the voice data to audio D/A converter 512 via the electronic switch 512. The resulting analog waveform is amplified and applied to handset speaker 514.

As for the transmit path, analog audio from the microphone 515 is applied to the audio A/D converter 512, which converts the microphone signal to a digital signal. The digital signal from the audio A/D converter 513 is applied to the H.323 DSP 508 via the voice electronic switch 511 and signal path H.323 IN. H.323 DSP 508 collects voice frame of 30 milliseconds duration, performs voice-encoding as per G.723 or G.729, and sends voice data to H.323 microcontroller 519. H.323 microcontroller 519 adds an RTP header, UDP header, and IP header to the voice frame received from H.323 DSP 508. H.323 microcontroller 519 then sends assembled IP packet out over 9.6 Kb/s asynchronous data link to PCS1900 microcontroller 520 at port Data In 534.

H.323 microcontroller 519 then processes any H.225 Call Control packets to be sent. These packets are used for call control, signalling channels, call set up request, and call alerting. H.323 microcontroller 519 also processes any H.245 system control packets to be sent. These packets are used to open and close logical channels, exchange capabilities between terminal endpoints, and to describe the contents of the logical channels. H.323 microcontroller 519 then adds TCP header to any H.225 or H.245 packets, IP header to any TCP packets, and sends the fully assembled IP packets out over 9.6 Kb/s asynchronous data link to PCS1900 microcontroller 520 at port Data In 534. Once received by PCS1900 microcontroller 520, the fully assembled IP packets are treated the same as any form of data, and are processed in accordance with the steps described above in accordance with the handset's normal data mode.

The above description describes the manner in which voice communication is realized once a voice over IP handset call has been established, be it by way of direct call establishment (i.e. Scenario 1 of FIG. 1), or by SMS transfer (Scenarios 2 and 3 of FIG. 1). With reference to steps 302–310 of FIG. 3, the following is a description of how the PCS1900 handset illustrated in FIG. 5 uses SMS to establish a call over the Internet.

At step 302, a software program stored in ROM 523 and running on PCS microcontroller 520 will ascertain that it does not have a fixed IP address. Accordingly, the process will proceed to step 303. At step 303, an Internet connection is made between the handset and its ISP so the device can be assigned a temporary IP address. First, PCS microcontroller 520 will retrieve the telephone number of its ISP from RAM 522. This telephone number will have been previously identified as a telephone number for a data call. PCS microcontroller 520 will then store a layer 3 message in RAM 522 requesting data call set-up to the ISP telephone number. PCS microcontroller then sends the layer 3 message to PCS DSP 505, which will send a data call set-up message to the handset's basestation over a control channel. Upon establishment of the data call, the handset's ISP will return a data call confirmation to the handset.

At step 304, the handset's ISP will assign a temporary IP address to the handset. The handset will switch to normal data mode in order to exchange data with the ISP. Note that any data exchanged with the ISP will not be applied to external data interface 521, but is consumed by the PCS microcontroller 520. PCS microcontroller will run Point-to-Point protocol (PPP) over the data channel with the ISP. The ISP will then deliver a temporary IP address to the handset over that data channel. The PCS microcontroller will then store the temporary IP address in RAM 522.

At step 305, PCS microcontroller 520 will first retrieve the temporary IP address from RAM 522. PCS microcontroller 520 of IP enabled device 1 (a digital cellular handset, of the same or similar type to IWEH1 illustrated in FIG. 2) will then generate in its RAM buffer an SMS message addressed to IP enabled device 2 (also a digital cellular handset, of the same or similar type as IWEH2 in FIG. 2), also containing its own IP address, and the Internet protocol call request IPCALLRQ embedded therein. At step 306, PCS microcontroller 520 retrieves the SMS message from its RAM buffer, and then formats it into a layer 3 message (as per J-STD-007) and stores it in RAM 522. PCS microcontroller sends the layer 3 message to PCS DSP505, which is then applied to the radio channel in accordance with the handset's short message service mode (The SMS is sent over the control channel, and this occurs simultaneously with any data or voice channel operation).

At step 307, IP enabled device 2 receives the layer 3 message (representing the incoming SMS message from IP enabled device 1). The PCS microcontroller of IP enabled device 2 converts the layer 3 message into an SMS message and stores it in RAM.

At step 308, the PCS microcontroller of IP enabled device 2 reads the Internet protocol call request and the IP address of IP enabled device 1. The IP address of IP enabled device 1 is stored in the RAM of IP enabled device 2.

At step 309, IP enabled device 2 repeats steps 303 and 304 for itself (i.e. to establish a data connection with its own ISP so that it can obtain its own temporary IP address from its ISP).

At step 310, IP enabled device 2 has both its own IP address, and the IP address of IP enabled device 1. Both devices also have live data connections with their ISPs. IP enabled device 2 then switches to voice over IP mode as above. When this occurs, the PCS microcontroller of IP enabled device 2 sends H.225 call control information to IP enabled device 1 causing IP enabled device 1 to switch over to voice over IP mode as above. IP enabled device 1 and IP enabled device 2 then exchange H.225 call control information, which indicates the establishment of a H.323 voice call. As per H.323, IP enabled device 1 and IP enabled device 2 then exchange H.245 control information. At this point, voice communication is established and exchanged.

Numerous modifications and variations of the present invention are possible in light of the above teachings. It is therefore to be understood that within the scope of the appended claims, the invention may be practised otherwise than as specifically described herein. The above description of a preferred embodiment should not be interpreted in any limiting manner since variations and refinements can be made without departing from the spirit of the invention. The scope of the invention is defined by the appended claims and their equivalents.

We claim:

1. A digital cellular handset comprising:
   an antenna;
   a radio transceiver connected to said antenna;
   a radio analog-to-digital converter and a radio digital-to-analog converter connected to said transceiver;
   a digital cellular processor/microcontroller connected to said radio analog-to-digital and digital-to-analog converters;
   an Internet protocol processor/microcontroller connected to said digital cellular processor/microcontroller;
   an audio analog-to-digital converter and an audio digital-to-analog converter connected to said Internet protocol processor/microcontroller; and
   a speaker connected to said audio digital-to-analog converter and a microphone connected to said audio analog-to-digital converter; wherein,
   in the receive direction the transceiver receives radio signals from said antenna and converts them into analog baseband signals, the radio analog-to-digital converter converts said analog baseband signals into raw data signals, the digital cellular processor/microcontroller processes said raw data signals into a voice over Internet Protocol packetized data stream, the Internet protocol processor/microcontroller unpacketizes and processes said voice over Internet Protocol packetized data steam into a voice data stream, the audio digital-to-analog converter converts said voice data stream into analog waveforms, and the speaker broadcasts said analog waveforms, and,
   in the transmit direction the microphone receives analog waveforms, the audio analog-to-digital converter converts said analog waveforms into raw data signals, the Internet protocol processor/microcontroller packetizes and processes said raw data signals into a voice over Internet protocol packetized data stream, the digital cellular processor/microcontroller processes said voice over Internet Protocol packetized data stream into a digital cellular compatible data stream, the radio digital-to-analog converter converts said digital cellular compatible data stream into analog signals, and the transceiver converts the analog signals into a modulated radio carrier signal which is forwarded to said antenna.

2. The digital cellular handset of claim 1 further comprising a voice electronic switch selectively switchable between a first condition in which said digital cellular processor/microcontroller is connected to said audio analog-to-digital and digital-to-analog converters when said handset is in normal voice mode, and a second condition in which said Internet protocol processor/microcontroller is connected to said audio analog-to-digital and digital-to-analog converters when said handset is in voice over IF mode.

3. The digital cellular handset of claim 1 further comprising a data electronic switch selectively switchable between a first condition in which said digital cellular/microcontroller is connected to an external data interface when said handset is in normal data mode, and a second condition in which said digital cellular processor/microcontroller is connected to said Internet protocol processor/microcontroller when said handset is in voice over IP mode.

4. The digital cellular handset of claim 2 further comprising a data electronic switch selectively switchable between a first condition in which said digital cellular/microcontroller is connected to an external data interface when said handset is in normal data mode, and a second condition in which said digital cellular processor/microcontroller is connected to said Internet protocol processor/microcontroller when said handset is in voice over IF mode.

5. The digital cellular handset of claim 1 wherein said voice over Internet Protocol packetized data stream is packetized in accordance with one of the H.323, Session Initiation Protocol (SEP), and Media Gateway Control Protocol (MGCP) Internet protocols.

6. The digital cellular handset of claim 5 wherein said Internet protocol processor/microcontroller includes memory for storing Internet protocol software, and said Internet protocol processor/microcontroller runs said Internet protocol software to unpacketize and process said voice over Internet Protocol packetized data stream into said voice data stream.

7. A digital cellular handset composing:
   an antenna;
   a radio transceiver connected to said antenna;
   a radio analog-to-digital converter connected to said transceiver;
   a digital cellular processor/microcontroller connected to said radio analog-to-digital converter;
   an Internet protocol processor/microcontroller connected to said digital cellular processor/microcontroller;
   an audio digital-to-analog converter connected to said Internet protocol processor/microcontroller; and
   a speaker connected to said audio digital-to-analog converter, wherein,
   the transceiver receives radio signals from said antenna and converts them into analog baseband signals, the radio analog-to-digital converter converts said analog baseband signals into raw data signals, the digital cellular processor/microcontroller processes said raw data signals into a voice over Internet Protocol packetized data stream, the Internet protocol processor/microcontroller unpacketizes and processes said voice over Internet Protocol packetized data stream into a voice data stream, the audio digital-to-analog converter converts said voice data stream into analog waveforms, and the speaker broadcasts said analog waveforms.

8. The digital cellular handset of claim 7 further comprising a voice electronic switch selectively switchable between a first condition in which said digital cellular processor/microcontroller is connected to said audio digital-to-analog converter when said handset is in normal voice mode, and a second condition in which said Internet protocol processor/microcontroller is connected to said audio digital-to-analog converter when said hands is in voice over IP mode.

9. The digital cellular handset of claim 7 further comprising data electronic switch selectively switchable between a first condition in which said digital cellular/microcontroller is connected to an external data interface when said handset is in normal data mode, and a second condition in which said digital cellular processor/microcontroller is connected to said Internet protocol processor/microcontroller when said handset is in voice over IP mode.

10. The digital cellular handset of claim 8 further comprising a data electronic switch selectively switchable between a first condition in which said digital cellular/microcontroller is connected to an external data interface when said handset is in normal data mode, and a second condition in which said digital cellular processor/microcontroller is connected to said Internet protocol processor/microcontroller when said handset is in voice over IP mode.

11. The digital cellular handset of claim 7 wherein said voice aver Internet Protocol packetized data stream is packetized in accordance with one of the H.323, Session Initiation Protocol (SIP), and Media Gateway Control Protocol (MGCP) Internet protocols.

12. The digital cellular handset of claim 11 wherein said Internet protocol processor/microcontroller includes memory for storing Internet protocol software, and said Internet protocol processor/microcontroller runs said Internet protocol software to unpacketize and process said voice over Inter Protocol packetized data stream into said voice data stream.

13. A digital cellular handset comprising:
   an antenna;
   a radio transceiver connected to said antenna;
   a radio digital-to-analog converter connected to said transceiver;
   a digital cellular processor/microcontroller connected to said audio digital-to-analog converters;
   an Internet protocol process microcontroller connected to said digital cellular processor/microcontroller;
   an audio analog-digital converter connected to said Internet protocol processor/microcontroller, and
   a microphone connected to said audio analog-to-digital converter; wherein, the microphone receives analog waveforms, the audio analog-to-digital converter converts said analog waveforms into raw data signals, the Internet protocol processor/microcontroller packetizes and processes said raw data signals into a voice over Internet Protocol packetized data stream the digital cellular processor microcontroller processes said voice over Internet Protocol packetize data stream into a digital cellular compatible data stream, the radio digital-to-analog converter converts said digital cellular compatible data stream into analog signals, and the transceiver converts the analog signals into a modulated radio carrier signal which is applied to said antenna.

14. The digital cellular handset of claim 13 further comprising a voice electronic switch selectively switchable between a first condition ill which said digital cellular processor/microcontroller is connected to said audio analog-to-digital and digital-to-analog converters when said handset is in normal voice mode, and a second condition in which said Internet protocol processor/microcontroller is connected to said audio analog-to-digital and digital-to-analog converters when said handset is in voice over IP mode.

15. The digital cellular handset of claim 13 further comprising a data electronic switch selectively switchable between a first condition in which said digital cellular/microcontroller is connected to an external data interface when said handset is in normal data mode, and a second condition in which said digital cellular processor/microcontroller is connected to said Internet protocol processor/microcontroller when said handset is in voice over IP mode.

16. The digital cellular handset of claim 14 further comprising a data electronic switch selectively switchable between a first condition in which said digital cellular/microcontroller is connected to an external data interface when said handset is in normal data mode, and a second condition in which said digital cellular processor/microcontroller is connected to said Internet protocol processor/microcontroller when said handset is in voice over IP mode.

17. The digital cellular handset of claim 13 wherein said voice over Internet Protocol packed data stream is packetized in accordance with one of the H.323, Session Initiation Protocol (SEP), and Media Gateway Control Protocol (MGCP) Internet protocols.

18. The digital cellular handset of claim 17 wherein said Internet protocol processor/microcontroller includes memory for storing Internet protocol software, and said Internet protocol processor/microcontroller runs said Internet protocol software to packetize and process said raw data signals into a voice over Internet Protocol packetized data stream.

19. A method of digital cellular communications comprising the steps of:
   receiving radio signals from a digital cellular network;
   converting said radio signals ino raw data signals;
   processing said raw data signals into a voice over Internet Protocol packetized data stream;
   unpacketizing said voice over Internet Protocol packetized data stream into a voice data stream;
   converting said voice data stream into analog waveforms; and
   broadcasting said analog waveforms.

20. The method of claim 19 further comprising the steps of:
   receiving analog waveforms;
   converting said analog waveforms into raw data signals;
   packetizing said raw data signals into a voice over Internet Protocol packetized data stream;
   processing said voice over Internet Protocol packetized data stream into a digital cellular compatible data stream;
   converting said digital cellular compatible data steam into radio signals; and
   transmitting said radio signals to a digital cellular network.

21. A method of digital cellular communications comprising the steps of:
   receiving analog waveforms;
   converting said analog waveforms into raw data signals;
   packetizing said raw data signals into a voice over Internet Protocol packetized data steam;
   processing said voice over Internet Protocol packetized data stream into a digital cellular compatible data stream;
   converting said digital cellular compatible data stream into radio signal nd transmitting said radio signals to a digital cellular network.

22. A method of initiating digital cellular communications over the Internet between a first Internet protocol enabled device and a second Internet protocol enabled device comprising the steps of:

generating a Short Message Service (SMS) message with the Internet protocol (IP) address of the first Internet protocol enabled device embedded therein;

forwarding said SMS message to the second Internet protocol enabled device to initiate a call setup, wherein the second Internet protocol enabled device does not have a fixed IP address;

extracting the IP address from said SMS message; and using the IP address to connect the second Internet protocol enabled device to the first Internet protocol enabled device over the Internet.

23. The method of claim 22 further comprising the steps of the first Internet protocol enabled device:

receiving radio signals from a digital cellular network;

converting said radio signals into raw data signals;

processing said raw data signals into a voice over Internet Protocol packetized data stream;

unpacketizing said voice over Internet Protocol packetized data stream into a voice data stream;

converting said voice data stream into analog waveforms; and broadcasting said analog waveforms.

24. The method of claim 23 further comprising the steps elf the first Internet protocol enabled device:

receiving analog waveforms;

converting said analog waveforms into raw data signals;

packetizing said raw data signals into a voice over Internet Protocol packetized data stream:

processing said voice over Internet Protocol packetized data stream into a digital cellular compatible data steam;

converting said digital cellular compatible data stream into radio signal; and transmitting said radio signals to a digital cellular network.

25. The method of claim 22 further comprising the steps of:

connecting to an internet service provider;

attributing an IP address to the first Internet protocol enabled device; and forwarding said IP address to the first Internet protocol enabled device.

26. The method of claim 22 wherein the SMS message fisher includes an Internet Protocol call request embedded therein.

* * * * *

UNITED STATES PATENT AND TRADEMARK OFFICE
CERTIFICATE OF CORRECTION

PATENT NO. : 6,847,632 B1
DATED : January 25, 2005
INVENTOR(S) : Michael C.G. Lee et al.

It is certified that error appears in the above-identified patent and that said Letters Patent is hereby corrected as shown below:

Column 17,
Line 44, "…steam…" should read -- …stream… --.

Column 18,
Line 3, "…IF…" should read -- …IP… --.
Line 21, "…IF…" should read -- …IP… --.
Line 25, "…(SEP)…" should read -- …(SIP)… --.
Line 34, "…composing…" should read -- …comprising… --.
Line 47, "…converter, wherein,…" should read -- …converter; wherein,… --.
Line 67, "…hands…" should read -- …handset… --.

Column 19,
Lines 1 and 2, "…comprising…" should read -- …comprising a… --.
Line 19, "…aver…" should read -- …over… --.
Line 28, "…Inter…" should read -- …Internet… --.
Line 37, "…audio…" should read -- …radio… --.
Line 38, "…process microcontroller…" should read -- …processor/microcontroller… --.
Line 40, "…analog-digital…" should read -- …analog-to-digital… --.
Line 41, "…processor/microcontroller,…" should read -- …processor/microcontroller;… --.
Line 48, "…stream…" should read -- …stream,… --.
Line 49, "…processor microcontroller…" should read -- …processor/microcontroller… --.
Line 50, "…packetize…" should read -- …packetized… --.
Line 59, "…ill…" should read -- …in… --.

Column 20,
Line 18, "…packed…" should read -- …packetized… --.
Line 20, "…(SEP)…" should read -- …(SIP)… --.
Lines 51 and 61, "…steam…" should read -- …stream… --.
Line 66, "…signal…" should read -- …signals… --.
Line 66, "…nd…" should read -- …and… --.
Line 66, make a new paragraph at the word "transmitting".

Column 22,
Line 2, "…elf…" should read -- …of… --.
Line 7, "…stream:…" should read -- …stream;… --.
Line 10, "…steam…" should read -- …stream… --.
Line 12, "…signal;…" should read -- …signals;…--.

UNITED STATES PATENT AND TRADEMARK OFFICE
CERTIFICATE OF CORRECTION

PATENT NO. : 6,847,632 B1
DATED : January 25, 2005
INVENTOR(S) : Michael C.G. Lee et al.

It is certified that error appears in the above-identified patent and that said Letters Patent is hereby corrected as shown below:

<u>Column 22 (cont'd),</u>
Line 18, "…internet…" should read -- …Internet… --.
Line 25, "…fisher…" should read -- …further… --.

Signed and Sealed this

Eighth Day of November, 2005

JON W. DUDAS
*Director of the United States Patent and Trademark Office*